UNITED STATES PATENT OFFICE.

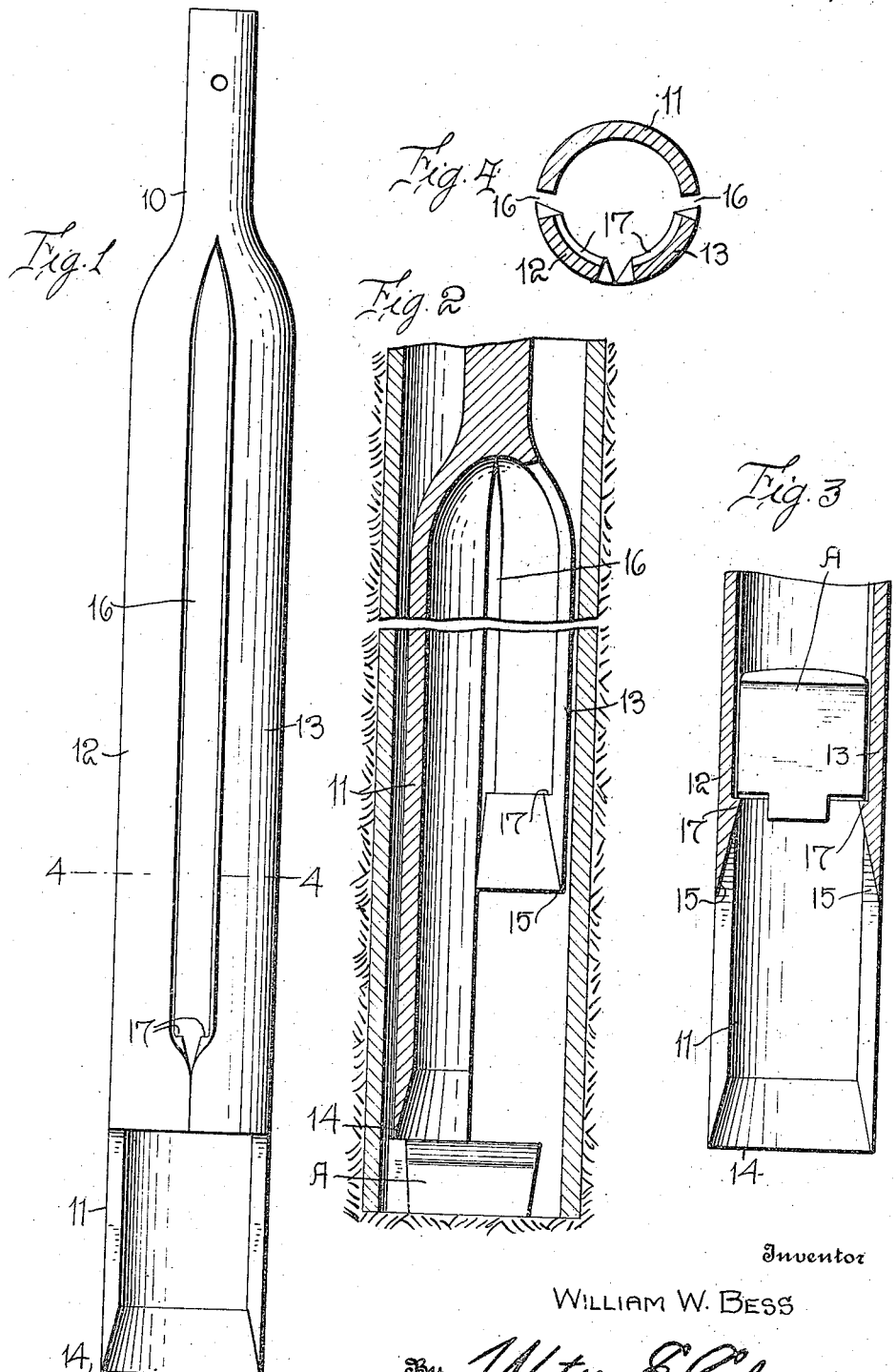

WILLIAM W. BESS, OF MARICOPA, CALIFORNIA.

FISHING-TOOL FOR UNDERREAMER-LUGS.

1,242,129. Specification of Letters Patent. Patented Oct. 9, 1917.

Application filed February 28, 1917. Serial No. 151,536.

*To all whom it may concern:*

Be it known that I, WILLIAM W. BESS, a citizen of the United States, residing at Maricopa, in the county of Kern and State of California, have invented certain new and useful Improvements in Fishing-Tools for Underreamer-Lugs, of which the following is a specification, reference being had to the accompanying drawings.

This invention relates to tools in drilling Artesian and oil wells and particularly to fishing tools.

One of the great troubles in drilling oil wells is that lugs from the under-reamer, which is used for enlarging the hole at the bottom of the well, become disconnected or broken off of the under-reamer and lodge in the hole, thus preventing the use of the drilling tools. The lug, when it falls, has a tendency to fall flat on the bottom of the hole because of its shape and this makes it still more difficult to remove.

The general object of my invention is to provide a fishing tool which is particularly adapted for fishing out these broken lugs from the under-reamers;

And a further object is to so construct the tool that it will straighten up the lug which lies flat upon the bottom of the hole and then pick up the lug after it has straightened it.

A further object is to form an implement of this character of a very simple construction, which may be cheaply made and which may be readily used.

The invention is illustrated in the accompanying drawing, in which:—

Figure 1 is an elevation of a fishing tool, embodying my invention;

Fig. 2 is a sectional view of the tool now in use;

Fig. 3 is a fragmentary sectional view of the tool taken at right angles to the section in Fig. 2 and showing the reamer lug engaged by the tool and ready to be lifted; and Fig. 4 is a section on the line 4—4 of Fig. 1.

Referring to these drawings, it will be seen that my improved tool comprises a shank 10 from which extends a plurality of transversely curved resilient sections shown as three in number and designated respectively 11, 12 and 13. The resilient member 11 is approximately semi-circular in form and has its inner face at the extremity of the member 11 sharpened as at 14. The members 12 and 13 at their extremities describe a semi-circle and these extremities are sharpened as at 15. The body of each of these members 12 and 13 is reduced in width thus leaving longitudinal openings 16 extending from the sharpened ends of the members 13 and 12 nearly to the shank 10. These members 12 and 13 are resilient, that is, they are radially yieldable and relatively they are readily yieldable. The member 11 is relatively unyieldable. The inner faces of the members 12 and 13 at their ends are thickened to provide inwardly projecting lugs or flanges 17. It will be noted from Fig. 1 that the members 12 and 13 are shorter than the member 11. For instance, for a tool of this character having a diameter of three inches, the section or member 11 will be approximately four inches longer than the members 12 and 13. The purpose of this difference in length will be later stated. The tool may be forged or formed in any desired manner, and I do not wish to limit myself to the particular details of construction. The shank 10 is connected to the ordinary drilling tools by a pin. This connection of the shank and drilling tools, however, has not been illustrated, as it is not believed to be necessary.

In the practical use of this invention, if a lug breaks from the under-reamer and becomes lodged in the hole then this tool is attached to the drilling tools and lowered into the well. The form of the lug which is used on under-reamer tools and which is supposed to have broken off is illustrated in Fig. 3 and is designated A. The shape of this lug is such that when it breaks off, it is liable to lie flat upon the bottom of the hole being drilled. The under-reamer is used for the purpose of enlarging the cross section of the well and as the under-reamer operates, the particles cut by the under-reamer drop to the bottom of the well and whenever one of the lugs is broken off or becomes detached from the tool, it falls to the bottom of the well or onto the top of the particles which accumulate thereon. Now when the lug is broken off, the fishing tool is reciprocated and constantly driven down into the accumulation at the bottom of the well or into the formation at the bottom of the well sufficiently so that when the fishing tool comes in contact with the lug it straightens the lug up, the lower end of the section 11 striking the broken lug and tipping it so that the lug will turn into a vertical position. By constantly driving the fishing tool downward it will force the under-reamer lug up into position so as to cause the members 12 and 13 to be forced outward, these members yielding to this end, and then the members 12 and 13 close upon the lug, the flanges or lugs 17 engaging with the lug A, so as to prevent the lug from dropping out. The fishing tool may then be raised, the lug detached and the operation proceeded with in the usual manner.

Having described my invention, what I claim is:—

1. A fishing tool of the character described, comprising a plurality of approximately parallel sections together defining a central longitudinally extending bore, one of said sections extending beyond the other sections and said other sections being resilient whereby they may move outward relative to the first named section and said other sections being formed with inwardly extending flanges on the free ends.

2. A fishing tool of the character described, comprising a shank, a semi-circular section attached to the shank, and a plurality of sections coacting with the semi-circular section and extending parallel thereto and together defining a semi-circle, said last named sections being shorter than the first named section and being resilient whereby their free ends may be moved outward, the inner face of said sections being formed with inwardly projecting flanges.

3. A fishing tool of the character described, comprising a shank, a semi-circular section attached to the shank but deflected therefrom and having its lower end beveled on its inside face, and a pair of transversely arcuate sections attached at their upper ends to the shank but deflected therefrom, said last named sections being shorter than the semi-circular section and being resilient whereby they may be outwardly moved, the inner faces of the last named sections at their lower ends being beveled and provided above said beveled portions with inwardly projecting flanges, the edges of said sections being spaced from each other except at their upper and lower ends.

4. A fishing tool of the character described, comprising a plurality of approximately parallel sections, together defining a central longitudinally extending bar, one of said sections extending beyond the other section, the shortest section being resilient whereby it may move outward relative to the first named longer section and being formed with an inwardly extending detent flange adjacent its free ends.

In testimony whereof I hereunto affix my signature in the presence of two witnesses.

WILLIAM W. BESS.

Witnesses:
 LEVI WELCH,
 A. W. NEWKIRK.